(12) United States Patent
Suzuki

(10) Patent No.: US 11,102,150 B2
(45) Date of Patent: Aug. 24, 2021

(54) COMMUNICATION APPARATUS AND CONTROL METHOD FOR COMMUNICATION APPARATUS

(71) Applicant: CANON KABUSHIKI KAISHA, Tokyo (JP)

(72) Inventor: Tomoya Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/134,628

(22) Filed: Sep. 18, 2018

(65) Prior Publication Data

US 2019/0089654 A1 Mar. 21, 2019

(30) Foreign Application Priority Data

Sep. 20, 2017 (JP) .............................. JP2017-180037

(51) Int. Cl.
*H04L 12/861* (2013.01)
*H04L 29/08* (2006.01)
*H04L 29/06* (2006.01)

(52) U.S. Cl.
CPC .......... *H04L 49/9042* (2013.01); *H04L 69/12* (2013.01); *H04L 69/324* (2013.01); *H04L 69/326* (2013.01)

(58) Field of Classification Search
CPC ... H04L 49/9042; H04L 69/12; H04L 69/324; H04L 69/326; H04L 47/10; H04L 63/0428; H04L 45/24; H04L 61/2007; H04L 61/2076; H04L 61/2092; H04L 61/6004; H04L 63/0272; H04L 29/12216; H04L 29/12301; H04L 29/1232; H04L 29/12801; H04L 63/0421; H04L 45/00; H04L 45/28; H04L 61/35; H04L 63/0407; H04L 63/1458; H04L 29/12783; H04L 63/0227; H04L 63/04; H04L 63/0435; H04L 63/0876; H04L 61/1511; H04L 63/08;

(Continued)

(56) References Cited

U.S. PATENT DOCUMENTS 6,757,802 B2 * 6/2004 Trainin ................. G06F 12/023
707/999.202
6,912,646 B1 * 6/2005 Khu ...................... G06F 12/023
711/163

(Continued)

*Primary Examiner* — Hardikkumar D Patel
(74) *Attorney, Agent, or Firm* — Canon U.S.A., Inc. IP Division

(57) ABSTRACT

A communication apparatus capable of efficiently creating transmission packets even when a free space of a storage unit storing transmission packet headers is insufficient includes a first storage unit to store a header of a transmission packet when the transmission packet is created in a first processing procedure, a first creation unit to create the transmission packet in the first processing procedure using the first storage unit, a second storage unit to store the transmission packet header when the transmission packet is created in a second processing procedure, a second creation unit to create the transmission packet in the second processing procedure using the second storage unit, and a control unit to control which one of the first and second creation units is used based on a data size necessary for the first creation unit to create the header and a free space of the first storage unit.

11 Claims, 9 Drawing Sheets

(58) Field of Classification Search
CPC ........... H04L 63/1466; H04L 29/12066; H04L 29/12594; H04L 61/303; H04L 63/0478; H04L 63/0485; H04L 63/105; H04L 63/1408; H04L 63/1416; H04L 63/164; H04L 67/14; H04L 12/4641; H04L 41/00; H04L 61/3015; H04L 63/168; H04L 67/141; H04L 63/1491; H04L 63/10; H04L 63/0414; H04L 63/0281; H04L 29/12047; H04L 45/20; H04L 61/15; H04L 61/2539; H04L 61/30; H04L 63/029; H04L 63/061; H04L 63/1441; H04L 63/18; H04L 69/14; H04L 9/065; H04L 65/403; H04L 69/22; H04L 43/02; H04L 43/06; H04L 43/0829; H04L 43/106; H04L 49/109; H04L 49/602; H04L 61/2038; H04L 61/6013; H04L 61/6022; H04L 63/0853; H04L 63/0884; H04L 67/2804; H04L 12/403; H04L 1/0043; H04L 1/0052; H04L 1/0061; H04L 1/0072; H04L 41/042; H04L 41/044; H04L 41/0803; H04L 41/0806; H04L 41/145; H04L 43/0847; H04L 43/10; H04L 43/16; H04L 43/50; H04L 45/38; H04L 45/54; H04L 49/208; H04L 49/90; H04L 65/1006; H04L 65/1069; H04L 65/1076; H04L 65/1096; H04L 65/607; H04L 65/80; H04L 67/06; H04L 67/1097; H04L 67/28; H04L 67/2852; H04L 69/04; H04L 69/16; H04L 69/161; H04L 69/164; H04L 69/168; H04L 69/18; H04L 69/28; H04L 69/321; G06F 12/023; G06T 1/20; H04N 1/40; H04N 21/2381; H04N 21/6437; H04B 7/2606

See application file for complete search history.

(56) References Cited

U.S. PATENT DOCUMENTS

| | | | | |
|---|---|---|---|---|
| 8,184,691 | B1* | 5/2012 | Henson | H04N 19/152 |
| | | | | 375/240.02 |
| 2007/0223472 | A1* | 9/2007 | Tachibana | H04L 47/10 |
| | | | | 370/389 |
| 2008/0192741 | A1* | 8/2008 | Lee | H04L 69/161 |
| | | | | 370/389 |
| 2018/0219800 | A1* | 8/2018 | Huynh | H04L 49/90 |

* cited by examiner

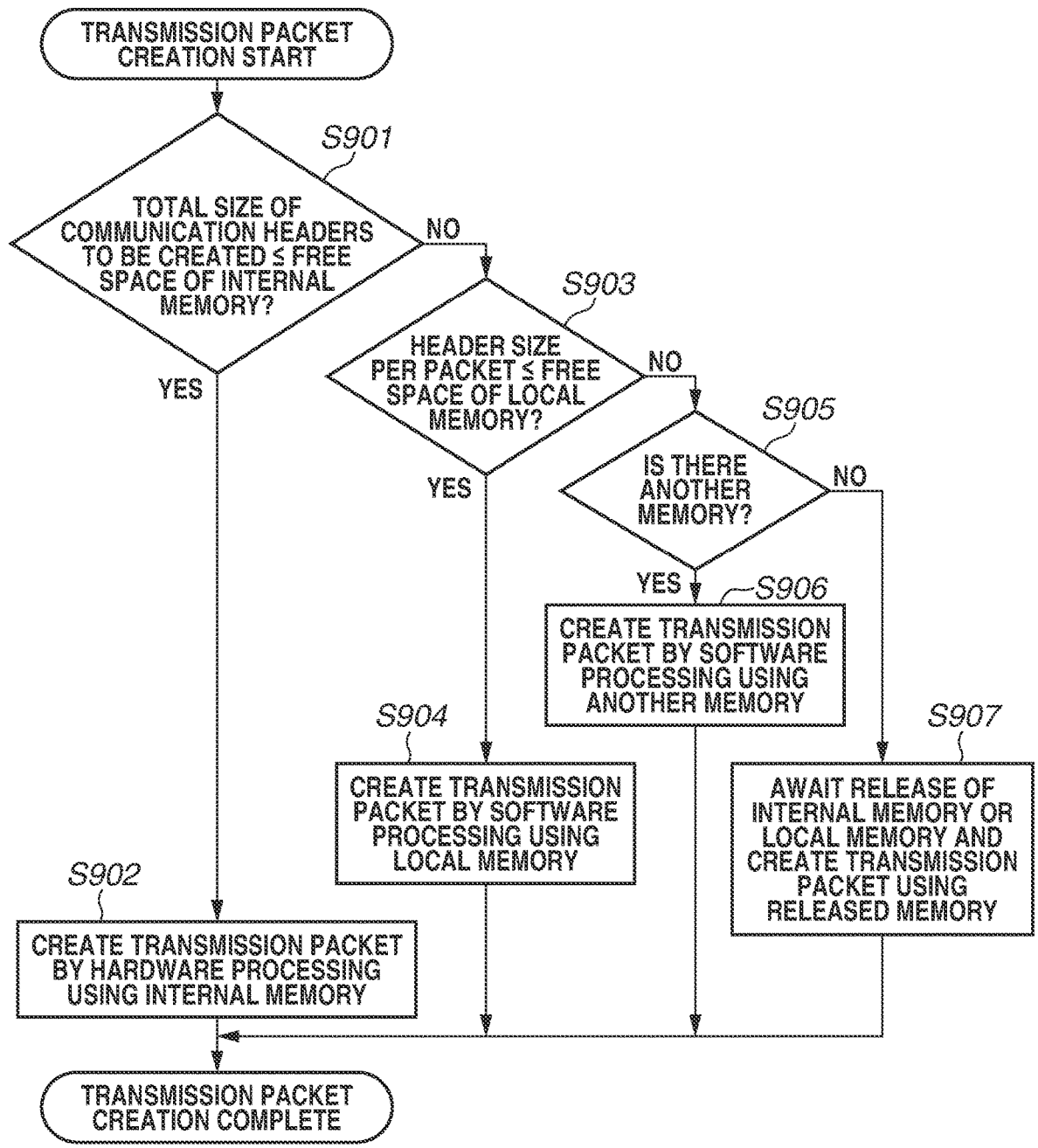

COMMUNICATION APPARATUS AND CONTROL METHOD FOR COMMUNICATION APPARATUS

BACKGROUND

Field of the Disclosure

The present disclosure relates to a communication apparatus and a control method for the communication apparatus.

Description of the Related Art

In recent years, data traffic has been increasing along with increasing needs for browsing high-resolution moving images (8K/4K resolution images) on multifunction terminals called smart devices, which have been rapidly increasing, via a network. In addition, a load on a central processing unit (CPU) due to communication protocol processing using, for example, Transport Control Protocol (TCP)/User Datagram Protocol (UDP)/Internet Protocol (IP), has been increasing along with an improvement in the speed of networks for, for example, 10 gigabit per second (Gbps) communication by Ethernet® and 5th-Generation (5G) communication for a moving object communication. To achieve high-speed data communication using a communication protocol such as TCP/UDP/IP, a technique for reducing a communication protocol processing load on a CPU has been proposed.

As a technique for reducing a communication protocol processing load on a CPU, there is a technique of reducing a load on a CPU by off-loading a part (TCP segment processing) of communication protocol processing to be executed by the CPU. The TCP segment processing is processing of converting transmission data created in an application layer, which is defined by an Open Systems Interconnection (OSI) reference model designed by the International Organization for Standardization (ISO), into transmission packets to be used in a communication layer which is a lower layer.

As an example of the TCP segment processing, a transmission packet creation method is discussed in United States Patent Publication Application No. 2007/0223472. In United States Patent Publication Application No. 2007/0223472, a payload dividing unit divides transmission data which is created in an application layer and has a length exceeding a transferable length into pieces of data each having a transferable length, thereby creating a plurality of transmission payloads. Then, a header duplicating unit creates (duplicates) as many headers as the number of transmission payloads so that the headers are given to the respective transmission payloads. After that, a packet generating unit generates a plurality of transmission packets by combining the created headers with the transmission payloads.

In United States Patent Publication Application No. 2007/0223472, the header duplicating unit creates a plurality of headers respectively corresponding to the transmission payloads and stores the created headers in a header buffer. However, the free space of the header buffer may be insufficient to store all the headers. In such a case, creating transmission packets after waiting for release of the header buffer leads to an increase in processing time required for creating transmission packets and to a deterioration in communication performance.

Accordingly, there is a need for a communication apparatus capable of efficiently creating transmission packets even when the free space of a storage unit for storing headers of transmission packets is insufficient.

SUMMARY

According to an aspect of the present disclosure, a communication apparatus includes a first storage unit configured to store a header of a transmission packet when the transmission packet is created in a first processing procedure, a first creation unit configured to create the transmission packet in the first processing procedure using the first storage unit, a second storage unit configured to store the header of the transmission packet when the transmission packet is created in a second processing procedure different from the first processing procedure, a second creation unit configured to create the transmission packet in the second processing procedure using the second storage unit, and a control unit configured to perform control to determine which one of the first creation unit and the second creation unit is used based on a data size necessary for the first creation unit to create the header and a free space of the first storage unit.

Further features of the present disclosure will become apparent from the following description of exemplary embodiments with reference to the attached drawings.

BRIEF DESCRIPTION OF THE DRAWINGS

FIG. 9 is a flowchart illustrating a procedure for switching transmission packet creation units according to one or more aspects of the present disclosure.

DESCRIPTION OF THE EMBODIMENTS

Exemplary embodiments for carrying out the present disclosure will be described in detail below with reference to the accompanying drawings. The exemplary embodiments described below are examples for implementing the present disclosure and should be modified or changed, as needed, depending on the configuration of an apparatus or system to which the present disclosure is applied, or depending on various conditions. The present disclosure is not limited to the exemplary embodiments described below.

(Configuration of Apparatus)

Figure 1:
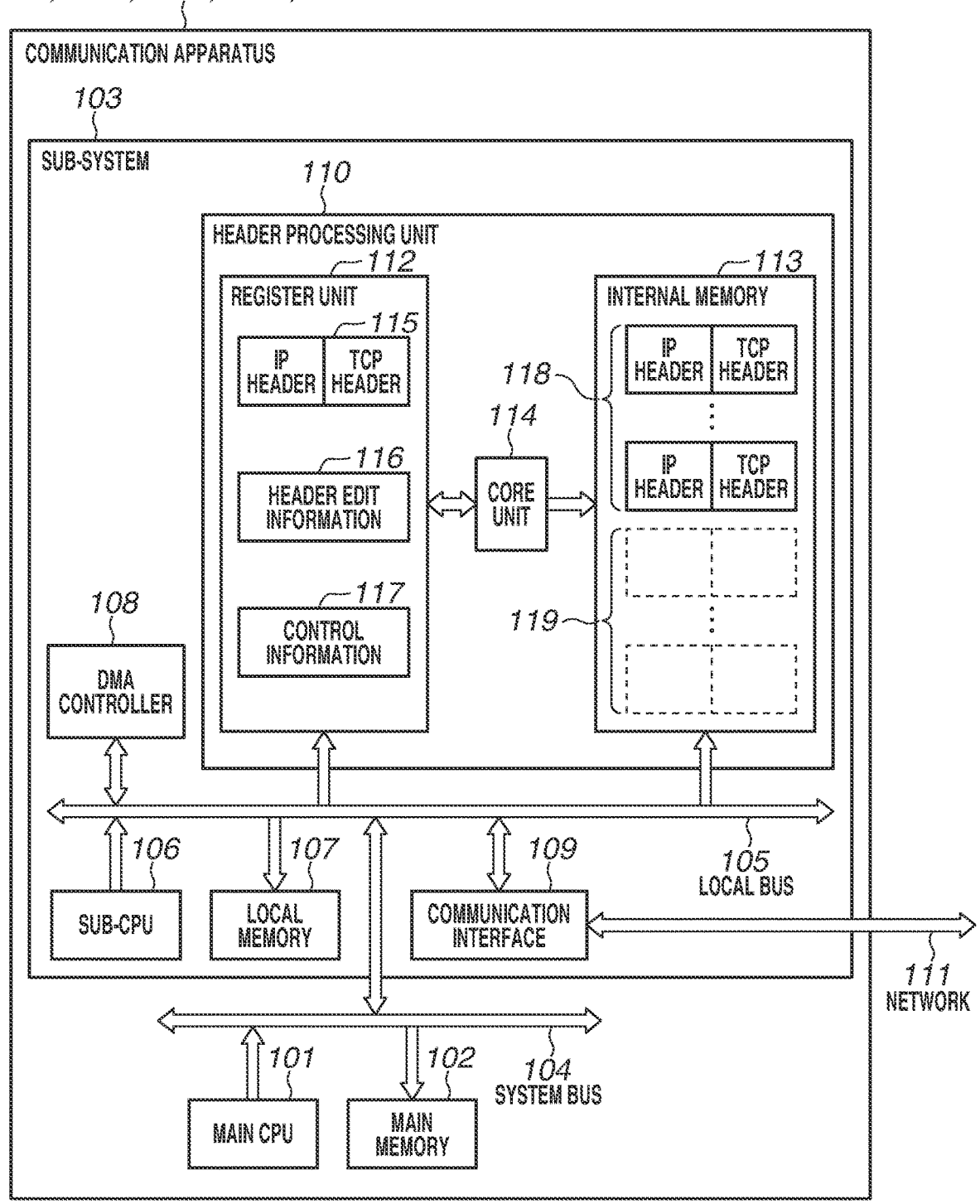
FIG. 1 is a block diagram illustrating an example of a module configuration (hardware configuration) of a communication apparatus.

FIG. 1 is a block diagram illustrating a module configuration example of a communication apparatus 100 according to a first exemplary embodiment. The communication apparatus 100 need not necessarily include all the modules described below, and may include modules other than the modules described below.

The communication apparatus 100 includes a main central processing unit (CPU) 101, a main memory 102, and a sub-system 103. The sub-system 103 executes communication protocol processing. The modules 101 to 103 in the communication apparatus 100 are connected to each other via a system bus 104.

The main CPU 101 executes application software in an application layer defined by an Open Systems Interconnection (OSI) reference model. Further, the main CPU 101 controls the entire communication apparatus 100. Data and programs required for the main CPU 101 to execute the application software are stored in the main memory 102. The main CPU 101 loads data and programs, as needed, from the main memory 102 via the system bus 104, or writes data and programs into the main memory 102. The main CPU 101 may be configured using a processor such as a Micro-Processing Unit (MPU). The main CPU 101 may include a plurality of processors such as a multi-core processor.

The main memory 102 is a memory that can be shared among the modules 101 to 103 in the communication apparatus 100, and includes a semiconductor memory such as a dynamic random access memory (DRAM). An internal area of the main memory 102 is divided into an area for storing programs, an application buffer area used by the application software, and other areas.

The sub-system 103 includes, as main functional blocks, a sub-CPU 106, a local memory 107, a Direct Memory Access (DMA) controller 108, a communication interface 109, and a header processing unit 110. The functional blocks 106 to 110 in the sub-system 103 are connected to each other via a local bus 105. The communication interface 109 is connected to a network 111. The header processing unit 110 includes, as main functional blocks, a register unit 112, an internal memory 113, and a core unit 114. The network 111 may be a wired network or a wireless network.

The sub-system 103 executes communication protocol processing in the communication apparatus 100 as described above. The sub-system 103 specializes in communication protocol processing using, for example, Transport Control Protocol (TCP)/Internet Protocol (IP), and performs data transfer processing with an external device (another communication apparatus) via the network 111. Further, the sub-system 103 is equipped with hardware dedicated to communication protocol processing, and executes high-speed communication protocol processing on behalf of the main CPU 101. The communication protocols processed by the sub-system 103 may be communication protocols other than TCP/IP.

The sub-CPU 106 executes communication protocol processing. Specifically, the sub-CPU 106 performs communication protocol processing (transmission sequence control, congestion control, communication error control, etc.) of Internet Protocol version 4 (IPv4), Internet Protocol version 6 (IPv6), User Datagram. Protocol (UDP), and TCP. The sub-CPU 106 may be configured using one processor, or may be configured using a plurality of processors (multi-processor configuration). The sub-CPU 106 may also be configured using hardware for accelerating processors and some functions.

The local memory 107 is a memory that can be used by the sub-CPU 106, and includes a semiconductor memory such as a static random access memory (SRAM). The local memory 107 is also accessible from the main CPU 101 via the system bus 104 and the local bus 105.

The DMA controller 108 executes DMA transfer according to an instruction from the sub-CPU 106. The DMA transfer is executed according to contents described in a descriptor. The descriptor is a description of information, such as address information about a data transfer source, address information about a data transfer destination, and a transfer size of data transfer. The sub-CPU 106 writes the descriptor into the local memory 107, and then notifies the DMA controller 108 of a DMA, transfer start instruction. As a method for notifying the DMA transfer start instruction, for example, address information about the local memory 107 storing the descriptor may be set. The DMA controller 108 which has received the notification about the DMA transfer start instruction can execute DMA transfer between the main memory 102 and the local memory 107 and DMA transfer between the internal memory 113 and the local memory 107 based on the contents of the instruction. The DMA controller 108 can also execute DMA transfer between the internal memory 113 and the communication interface 109 and DMA transfer between the local memory 107 and the communication interface 109 based on the contents of the DMA transfer start instruction.

The communication interface 109 is an interface with the network 111, such as a local area network (LAN), and performs communication control for a physical layer (PHY layer) and a data link layer (MAC layer) in the communication. The communication interface 109 includes a buffer memory for temporarily storing transmission/reception information therein. The transmission/reception information is input and output by DMA transfer of the DMA controller 108. The communication interface 109 may incorporate a DMA controller such that the transmission/reception information is input and output by DMA transmission using the DMA controller. A plurality of communication interfaces 109 may be provided. For example, when the network 111 is a wired network, a communication interface suitable for the wired network is used. When the network 111 is a wireless network, a communication interface suitable for the wireless network is used.

In the present exemplary embodiment, the header processing unit 110 executes communication header creation processing in the communication protocol processing on behalf of the sub-CPU 106. The header processing unit 110 may be configured as, for example, hardware for accelerating header processing.

The register unit 112 stores header information 115 (hereinafter referred to as the "template header 115") as a template for header processing, header edit information 116 necessary for creating a communication header, control information 117 necessary for controlling the core unit 114, and the like.

The template header 115 is header information which is duplicated by the header processing unit 110 and serves as a basis for creating a plurality of communication headers 118. The sub-CPU 106 creates the template header 115 by software processing. The configuration of the template header 115 is divided into, for example, a TCP header in a transport layer and an IP header in a network layer, which are defined by the OSI reference model. The TCP header and the IP header are used when communication protocol processing in each layer is executed. The template header 115 may include not only the TCP header and the IP header, but also an Ether header. The Ether header is a communication header used in a data link layer defined by the OSI reference model in which a MAC address of a transmission destination and a MAC address of a transmission source are described. Further, in the template header 115, a UDP header may be used instead of the TCP header.

The header edit information 116 is edit information necessary for creating the communication headers 118. The sub-CPU 106 sets the header edit information 116 by software processing. The header edit information 116 contains the number of times of duplication of the template header 115, the type of each communication header 118 to be created, an edit portion in each communication header 118 created by duplicating the template header 115, an editing method, and other information.

The control information 117 is information necessary for controlling the core unit 114. The sub-CPU 106 sets the control information 117 by software processing.

The internal memory 113 is a memory that can be used by the core unit 114 of the header processing unit 110 and the sub-CPU 106, and includes a semiconductor memory such as a static random access memory (SRAM). The internal memory 113 stores the communication headers 118 created by the core unit 114. The internal memory 113 has a free space 119.

The core unit 114 is a module that executes header processing and is controlled based on the control information 117 stored in the register unit 112. When the core unit 114 starts header processing according to the control information 117 stored in the register unit 112, the core unit 114 duplicates a designated number of template headers 115 as the communication headers 118 in the internal memory 113 according to the header edit information 116 stored in the register unit 112. Further, the core unit 114 edits information in the headers of the communication headers 118 according to the header edit information 116, and then completes the creation of the communication headers 118.

(Software Configuration)

Figure 2:
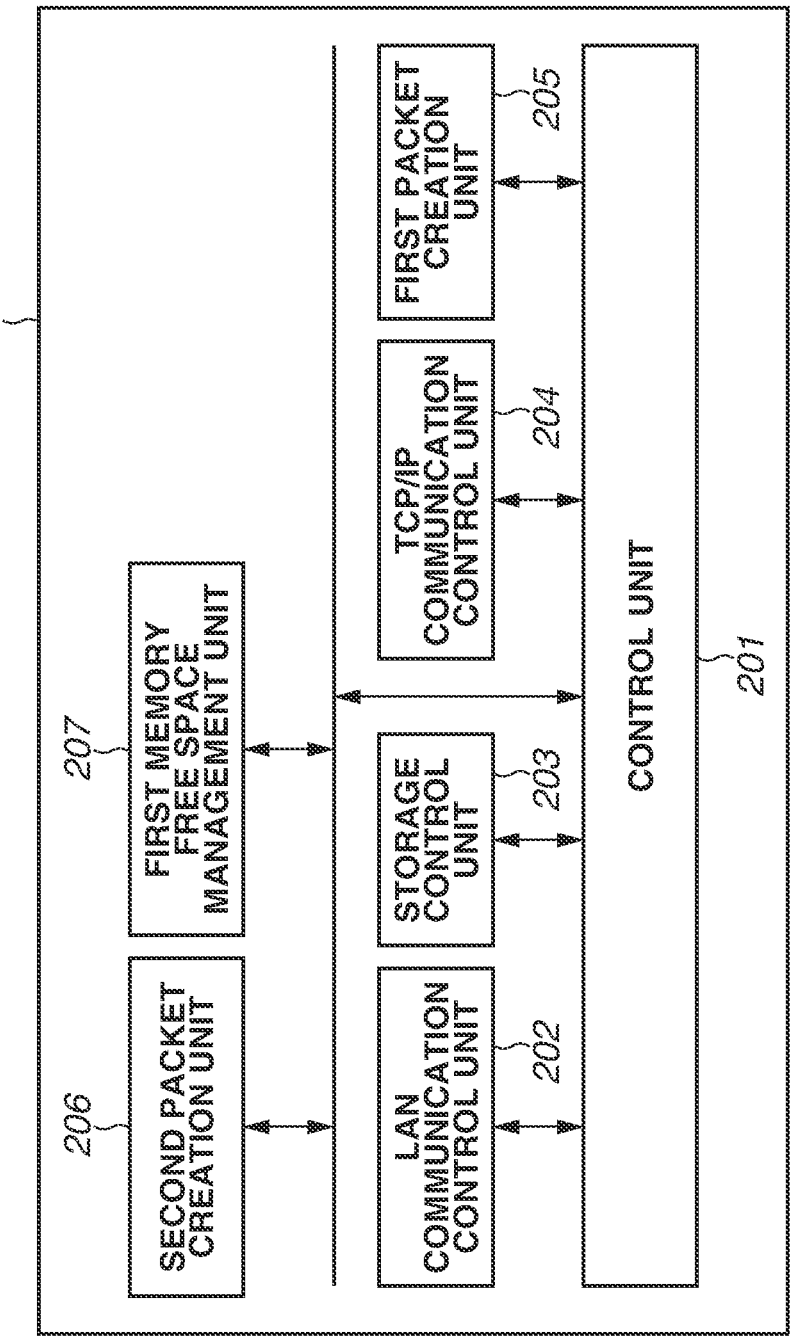
FIG. 2 is a block diagram illustrating an example of a configuration of a communication apparatus according to one or more aspects of the present disclosure.

FIG. 2 is a block diagram illustrating a software configuration of the communication apparatus 100 according to the present exemplary embodiment.

The communication apparatus 100 includes a control unit 201, a LAN communication control unit 202, a storage control unit 203, a TCP/IP communication control unit 204, a first packet creation unit 205, a second packet creation unit 206, and a first memory free space management unit 207. The TCP/IP communication control unit 204 is hereinafter referred to as the "TCP/IP control unit 204".

Processing to be performed by each of the units 201 to 207 in the communication apparatus 100 illustrated in FIG. 2 is executed by the sub-CPU 106 of the sub-system 103 (FIG. 1). The communication apparatus 100 need not necessarily include all the units 201 to 207 described above.

The control unit 201 controls the LAN communication control unit 202, the storage control unit 203, the TCP/IP communication control unit 204, the first packet creation unit 205, the second packet creation unit 206, and the first memory free space management unit 207 in the communication apparatus 100.

The LAN communication control unit 202 controls the communication interface 109 (FIG. 1) and also controls LAN communication with another communication apparatus (not illustrated). In a case where the communication apparatus 100 is connected to another communication apparatus via an external wireless access point (not illustrated), the LAN communication control unit 202 controls the communication interface 109 to thereby control wireless LAN communication with the wireless access point. The communication method of the LAN communication control unit 202 is not limited to the communication methods described above. Other communication methods capable of IP communication, such as a wired LAN communication function, may also be used.

The storage control unit 203 controls the main memory 102 and the local memory 107, and stores or deletes data such as processing data, an image content, and a video content.

The TCP/IP control unit 204 uses the LAN communication control unit 202 to perform communication control using the TCP/IP method with another communication apparatus. While the present exemplary embodiment illustrates an example where TCP/IP communication is used, the communication protocol is not limited to this. Other protocols such as a UDP may also be used.

The first packet creation unit 205 creates the communication headers 118 by hardware processing using the header processing unit 110 of the sub-system 103, and collectively creates a plurality of transmission packets using the communication headers 118. The first packet creation unit 205 is used by the TCP/IP control unit 204.

The second packet creation unit 206 creates transmission packets by software processing. Specifically, the second packet creation unit 206 creates communication headers by software processing, and creates transmission packets using the communication headers. The second packet creation unit 206 does not use the header processing unit 110. The second packet creation unit 206 is used by the TCP/IP control unit 204.

The first memory free space management unit 207 manages a free space 119 of the internal memory 113. The first memory free space management unit 207 is used by the TCP/IP control unit 204.

(Processing Procedure of Packet Creation Unit)

A processing procedure of the first packet creation unit 205 will now be described. The processing procedure described below is an example of the processing procedure performed by the first packet creation unit 205. Other processing procedures may be employed as long as the packet creation unit 205 creates the communication headers 118 in the internal memory 113.

The first packet creation unit 205 (main CPU 101) first detects whether transmission data is stored in the application buffer of the main memory 102. The transmission data is data to be transmitted by the communication apparatus 100 to another communication apparatus. When it is detected that the transmission data is stored in the application buffer, the first packet creation unit 205 (main CPU 101) notifies the sub-CPU 106 in the sub-system 103 of transmission information, such as a data size, a storage location, and other transmission data. The sub-CPU 106 (first packet creation unit 205) which has received the notification uses the DMA controller 108 to transfer the transmission data from the main memory 102 to the local memory 107 based on the transmission information. Next, the first packet creation unit 205 (sub-CPU 106) divides the transmission data stored in the local memory 107 into units of packets and sets a payload portion in each packet. Further, the first packet creation unit 205 (sub-CPU 106) sets, as information necessary for creating a header, the template header 115, the header edit information 116, and the control information 117 in the register unit 112 of the header processing unit 110. Furthermore, the first packet creation unit 205 creates the communication headers 118 in the internal memory 113 through the header processing unit 110 (core unit 114) based on the information stored in the register unit 112. Lastly, the first packet creation unit 205 (sub-CPU 106) combines the communication headers 118 in the internal memory 113 with the transmission data in the local memory 107 through the DMA controller 108, thereby creating packets in the local memory 107.

The sub-CPU 106 transmits the created packets to an external apparatus (another communication apparatus) via the communication interface 109, using the DMA controller 108. While the present exemplary embodiment illustrates an example where packets are created in the local memory 107, transmission data may be created in the main memory 102 or another memory.

Next, a processing procedure of the second packet creation unit 206 will be described. The processing procedure described below is an example of the processing procedure performed by the second packet creation unit 206. Other processing procedures may be employed as long as the packet creation 206 unit creates the communication headers 118 in the local memory 107.

The second packet creation unit 206 (main CPU 101) first detects that transmission data is stored in the application buffer of the main memory 102. After the detection, the second packet creation unit 206 (main CPU 101) notifies the sub-CPU 106 in the sub-system 103 of the transmission information. The sub-CPU 106 (second packet creation unit 206) which has received the notification uses the DMA controller 108 to transfer the transmission data from the main memory 102 to the local memory 107 based on the transmission information. Next, the second packet creation unit 206 (sub-CPU 106) divides the transmission data stored in the local memory 107 into units of packets and sets a payload portion in each packet. Further, the second packet creation unit 206 (sub-CPU 106) creates the communication headers 118 in the local memory 107 by software processing, and combines the communication headers 118 with the payloads, thereby creating packets.

The sub-CPU 106 transmits the created packets to an external apparatus via the communication interface 109. While the present exemplary embodiment illustrates an example where packets are created in the local memory 107, packets may be created in the main memory 102 or another memory.

(Packet Transmission Using Packet Creation Units Selectively)

Figure 3:
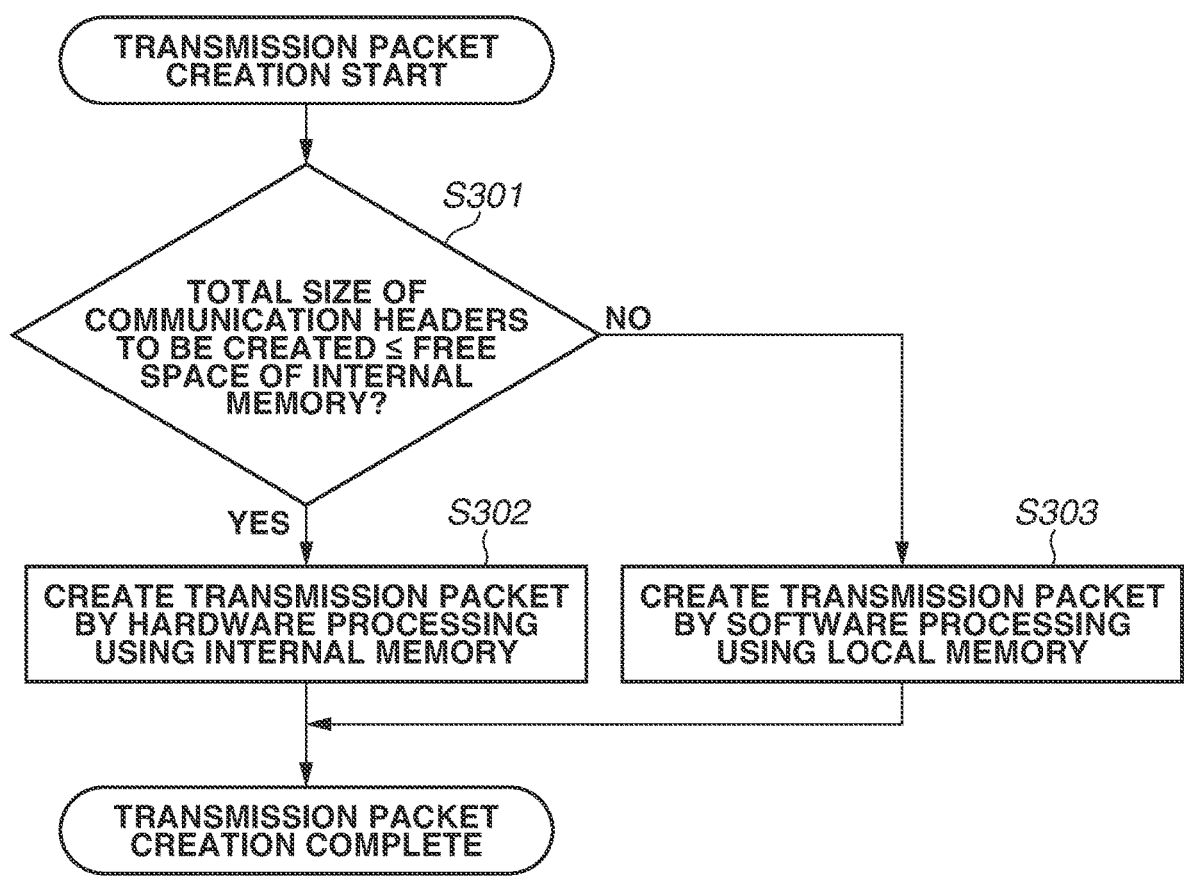
FIG. 3 is a flowchart illustrating a procedure for switching transmission packet creation units according to one or more aspects of the present disclosure.

FIG. 3 is a flowchart illustrating a procedure in which the communication apparatus 100 according to the present exemplary embodiment to switches transmission packet creation units. In the following description, a reference symbol "S" denotes a step.

In step S301, the TCP/IP control unit 204 of the communication apparatus 100 calculates the total size (header data size) of communication headers to be created based on the number of packets that can be collectively created when creating transmission packets. Further, the TCP/IP control unit 204 compares the calculated total size of communication headers with the size of the free space 119 acquired by the first memory free space management unit 207. Specifically, the TCP/IP control unit 204 determines whether the total size of communication headers to be created is equal to or less than the free space 119 of the internal memory 113. If the total size of communication headers to be created is equal to or less than the size of the free space 119 acquired by the first memory free space management unit 207 (YES in step S301), the processing proceeds to step S302. If the total size of communication headers to be created exceeds the size of the free space 119 acquired by the first memory free space management unit 207 (NO in step S301), the processing proceeds to step S303.

In step S302, the TCP/IP control unit 204 instructs the first packet creation unit 205 to create transmission packets. As described above, the first packet creation unit 205 creates the communication headers 118 in the internal memory 113. In other words, in step S302, the TCP/IP control unit 204 orders the first packet creation unit 205 to create communication packets by performing hardware processing using the internal memory 113. In response to the instruction, the first packet creation unit 205 creates transmission packets.

In step S303, the TCP/IP control unit 204 instructs the second packet creation unit 206 to create transmission packets. As described above, the second packet creation unit 206 creates the communication headers 118 in the local memory 107. In other words, in step S303, the TCP/IP control unit 204 orders the second packet creation unit 206 to create transmission packets by performing software processing using the local memory 107. In response to the instruction, the second packet creation unit 206 creates transmission packets.

In step S301, the TCP/IP control unit 204 selects whether to create transmission packets by performing hardware processing or create transmission packets by performing software processing, based on the free space 119 of the internal memory 113 and the data size required for creating headers in the case of creating transmission packets by hardware processing. If creation of transmission packets by hardware processing is selected (YES in step S301), the internal memory 113 is used to create transmission packets by performing hardware processing. If creation of transmission packets by software processing is selected (NO in step S301), the local memory 107 is used to create transmission packets by performing software processing. The data size required for creating headers may also be referred to as a header size.

It can be said that the case where the determination result of step S301 indicates YES corresponds to a case where the free space 119 of the internal memory 113 is equal to or more than the data size required for creating headers. It can be said that the case where the determination result of step S301 indicates NO corresponds to a case where the free space 119 of the internal memory 113 is less than the data size required for creating headers.

Advantageous Effects of First Exemplary Embodiment

The communication apparatus 100 according to the first exemplary embodiment selectively uses the first packet creation unit 205 and the second packet creation unit 206 based on the total size of communication headers to be created and the size of the free space 119 of the internal memory 113 in the case of collectively creating a plurality of transmission packets. Specifically, if the free space 119 of the internal memory 113 is insufficient (NO in step S301), in step S303, the second packet creation unit 206 is used to create transmission packets, without using the first packet creation unit 205 (without waiting for release of the internal memory 113). In this manner, using the first packet creation unit 205 and the second packet creation unit 206 in a selective manner prevents the processing of the first packet creation unit 205 from being unexecuted due to waiting for release of the internal memory 113 and also prevents a deterioration in the communication performance of the communication apparatus 100.

MODIFIED EXAMPLE

In step S301, the TCP/IP control unit 204 of the communication apparatus 100 calculates the total size of communication headers to be created based on the number of packets that can be collectively created. Alternatively, the total size of communication headers to be created may be calculated and acquired from the information held in the register unit 112.

Next, a communication apparatus 100A according to a second exemplary embodiment of the present disclosure will be described with reference to FIGS. 1, 4, and 5. In the following description, components, controls and processing similar to those of the first exemplary embodiment are denoted by the same reference numerals, and descriptions thereof will be thus omitted.

In the first exemplary embodiment, if the total size of communication headers to be created exceeds the size of the free space 119 of the internal memory 113 (NO in step S301), the second packet creation unit 206 is used to create transmission packets. The present disclosure is not limited to this exemplary embodiment. For example, even when the total size of communication headers to be created exceeds the size of the free space 119 of the internal memory 113, if a predetermined condition is satisfied, the first packet creation unit 205 may be used to create transmission packets after waiting for release of the internal memory 113. The communication apparatus 100A that performs such processing will be described below as the second exemplary embodiment.

(Configuration of Apparatus)

A module configuration of the communication apparatus 100A according to the second exemplary embodiment is similar to that of the first exemplary embodiment (FIG. 1). FIG. 4 illustrates a software configuration of the communication apparatus 100A according to the second exemplary embodiment. The software configuration illustrated in FIG. 4 is a configuration in which a communication interface specifying unit 208, a memory release time management unit 209, and a packet creation time calculation unit 210 are added to the software configuration (first exemplary embodiment) illustrated in FIG. 2.

The communication interface specifying unit 208 specifies the communication interface 109 (FIG. 1) used to transmit packets. For example, the communication interface specifying unit 208 specifies whether a communication interface suitable for a wired network is used or a communication interface suitable for a wireless network is used. The communication interface specifying unit 208 is used by the TCP/IP control unit 204. The communication interface specifying unit 208 acquires packet header information and communication interface information to be used when the LAN communication control unit 202 controls the communication interface 109 to transmit packets. Further, the communication interface specifying unit 208 manages the packet header information and the communication interface 109 in association with each other. The TCP/IP control unit 204 sends an inquiry about the communication interface to be used to the communication interface specifying unit 208 using the header information about the transmission packets.

The memory release time management unit 209 manages a time an average release time) required for the internal memory 113 to be released after the communication headers 118 are created in the internal memory 113 and packet transmission is completed. The memory release time management unit 209 manages the average release time by type (wireless LAN communication, wired LAN communication, etc.) of the communication interface 109 included in the communication apparatus 100A. The memory release time management unit 209 is used by the TCP/IP control unit 204. The average release time of the internal memory 113 held by the memory release time management unit 209 is set (input) in advance. The memory release time management unit 209 may measure a release time of the internal memory 113 during transmission processing and update the average release time.

A period of time (release time) from a time when the communication headers 118 are created in the internal memory 113 to a time when the packet transmission is completed and the internal memory 113 is released can also be referred to as a waiting time for the internal memory 113 to be released (memory release waiting time).

The packet creation time calculation unit 210 acquires and calculates a processing time (e.g., an average processing time) required for creating packets in the second packet creation unit 206 that creates the communication headers 118 in the local memory 107. The packet creation time calculation unit 210 is used by the TCP/IP control unit 204. The average processing time per packet that is held by the packet creation time calculation unit 210 is preliminarily set for each type of the communication interface 109. The packet creation time calculation unit 210 may measure a packet creation time of the second packet creation unit 206 and update the average processing time per packet.

(Packet Transmission Using Packet Creation Units Selectively)

Figure 5:
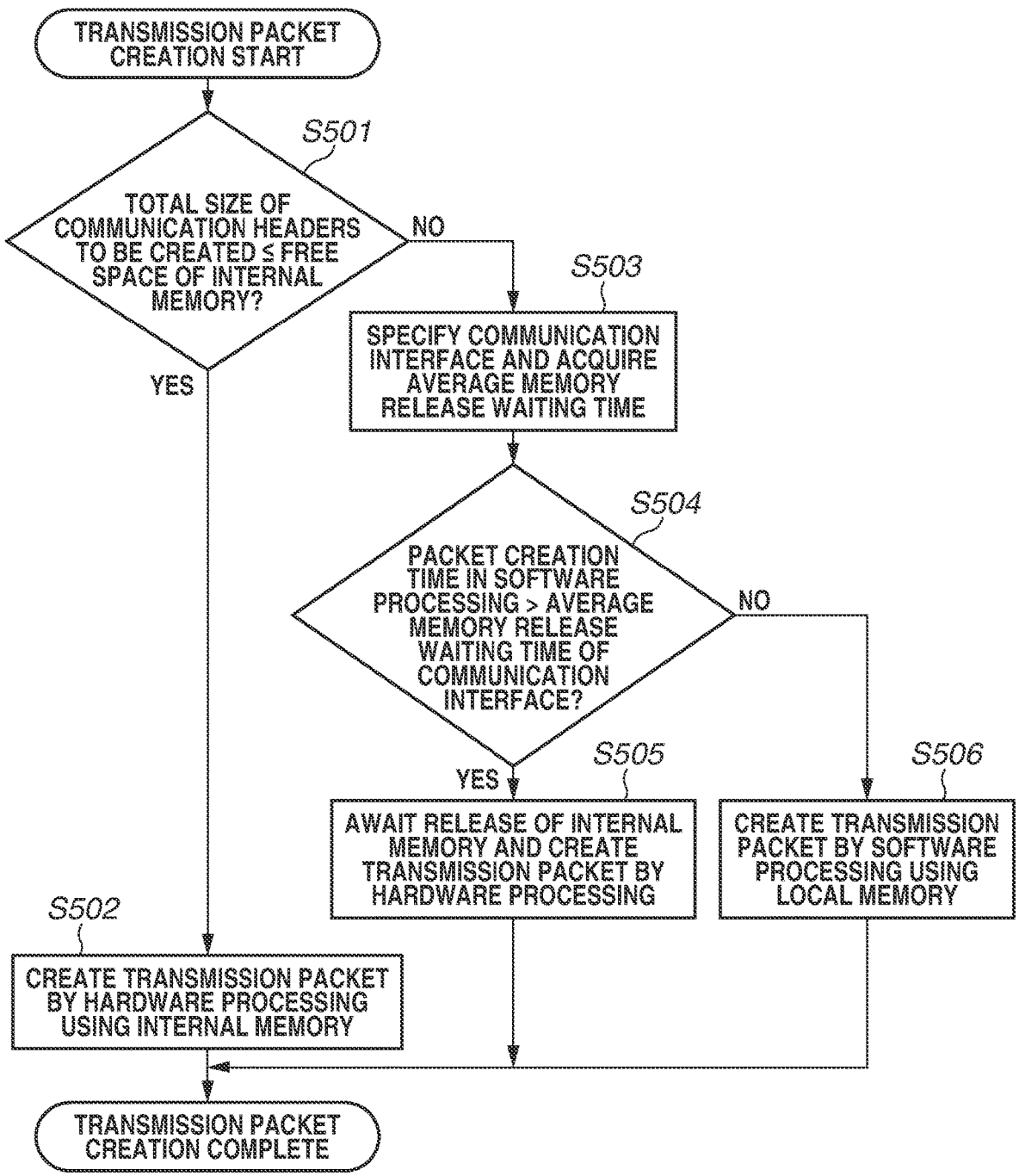
FIG. 5 is a flowchart illustrating a procedure for switching transmission packet creation units according to one or more aspects of the present disclosure.

FIG. 5 is a flowchart illustrating a procedure for the communication apparatus 100A according to the present exemplary embodiment to switch the transmission packet creation units.

Step S501 is similar to step S301. Step S502 is similar to step S302. If the determination result of step S501 indicates NO, the processing proceeds to step S503.

In step S503, the TCP/IP control unit 204 of the communication apparatus 100A uses the communication interface specifying unit 208 to specify the communication interface 109 through which transmission packets are transmitted. Then, the TCP/IP control unit 204 acquires an average release time (average memory release waiting time) of the specified communication interface 109 from the memory release time management unit 209. In the present exemplary embodiment, the release waiting time of the internal memory 113 is determined based on the specified communication interface 109.

In step S504, the TCP/IP control unit 204 uses the packet creation time calculation unit 210 to acquire a packet creation time for the second packet creation unit 206 to create packets corresponding to the number of packets to be created. In other words, the TCP/IP control unit 204 acquires the packet creation time for creating packets by performing software processing. Further, the TCP/IP control unit 204 compares the packet creation time in the second packet creation unit 206 with the average release time (average memory release waiting time of the communication interface) acquired in step S503. Specifically, the TCP/IP control unit 204 determines whether the packet creation time in software processing is longer than the average memory release waiting time of the communication interface. If the packet creation time of the second packet creation unit 206 is longer than the average release time (YES in step S504), the processing proceeds to step S505. If the packet creation time of the second packet creation unit 206 is equal to or less than the average release time (NO in step S504), the processing proceeds to step S506.

In step S505, the TCP/IP control unit 204 waits for release of the internal memory 113, and then sends an instruction for creating transmission packets in the first packet creation unit 205 that creates the communication headers 118 in the internal memory 113. Specifically, the TCP/IP control unit 204 waits for release of the internal memory 113 and instructs the first packet creation unit 205 to create transmission packets after the release. In response to the instruction, the first packet creation unit 205 creates transmission packets by hardware processing.

Step S506 is similar to step S303.

It can be said that the case where the processing proceeds from step S501 through step S505 corresponds to a case where the free space 119 of the internal memory 113 is less than the header data size and the release waiting time of the internal memory 113 is less than the packet creation time of the second packet creation unit 206. Further, the case where the processing proceeds from step S501 through step S506 corresponds to a case where the free space 119 of the internal memory 113 is less than the header data size and the release waiting time of the internal memory 113 is equal to or more than the packet creation time of the second packet creation unit 206.

Advantageous Effects of Second Exemplary Embodiment

The communication apparatus 100A according to the present exemplary embodiment does not immediately switch the packet creation units even when the total size of communication headers to be created exceeds the size of the free space 119 of the internal memory 113 in the case of collectively creating a plurality of transmission packets. The communication apparatus 100A determines which one of the first packet creation unit 205 and the second packet creation unit 206 is used to create transmission units after waiting for release of the internal memory 113 based on the average release time set for each communication interface 109. This determination enables improvement in the processing efficiency of creating transmission packets and prevents a deterioration in communication performance, as compared with the case of creating transmission packets in the second packet creation unit 206 every time when the free space 119 of the internal memory 113 is insufficient. In other words, in the second exemplary embodiment, even when the free space 119 of the internal memory 113 is insufficient, if any stagnation of the packet creation processing can be prevented by using the first packet creation unit 205 after waiting for release of the internal memory 113, release of the internal memory 113 is awaited.

MODIFIED EXAMPLE

In step S503, the communication interface 109 through which transmission packets are transmitted to another communication apparatus is specified and the average memory release waiting time corresponding to the specified communication interface 109 is acquired. However, the processing in step S503 is not limited thereto. Any processing may be performed in step S503, as long as the release waiting time of the internal memory 113 corresponding to the communication interface can be acquired (or calculated). For example, the processing of specifying the communication interface 109 may be omitted, as long as the release waiting time of the internal memory 113 corresponding to the communication interface can be acquired or calculated even when the processing of specifying the communication interface 109 is omitted.

Next, a communication apparatus 100B according to a third exemplary embodiment of the present disclosure will be described with reference to FIGS. 1, 6, and 7. In the following description, components, controls and processing similar to those of the first exemplary embodiment are denoted by the same reference numerals, and descriptions thereof will be omitted.

In the first exemplary embodiment, in the first step (S301) of the flowchart (FIG. 3) for switching the transmission packet creation units, it is only determined whether the total size of communication headers to be created is equal to or less than the size of the free space 119 of the internal memory 113. The present disclosure is not limited to this exemplary embodiment. For example, the first packet creation unit 205 and the second packet creation unit 206 may be selectively used in consideration of the number of transmission packets and header information (a flag, a protocol type, etc.). The communication apparatus 100B that performs such processing will be described below as the third exemplary embodiment.

(Configuration of Apparatus)

A module configuration of the communication apparatus 100B according to the present exemplary embodiment similar to that of the first exemplary embodiment (FIG. 1). FIG. 6 illustrates a software configuration of the communication apparatus 100B according to the present exemplary embodiment. The software configuration of FIG. 6 is a configuration in which a packet type determination unit 211 is added to the software configuration (first exemplary embodiment) illustrated in FIG. 2.

In the present exemplary embodiment, the number of transmission packets and header information (a flag, a protocol type, etc.) are collectively referred to as the type of a transmission packet. Accordingly, the packet type determination unit 211 determines the number of transmission packets and header information. The packet type determination unit 211 is used by the TCP/IP control unit 204.

(Packet Transmission Selectively Using Packet Creation Units)

Figure 7:
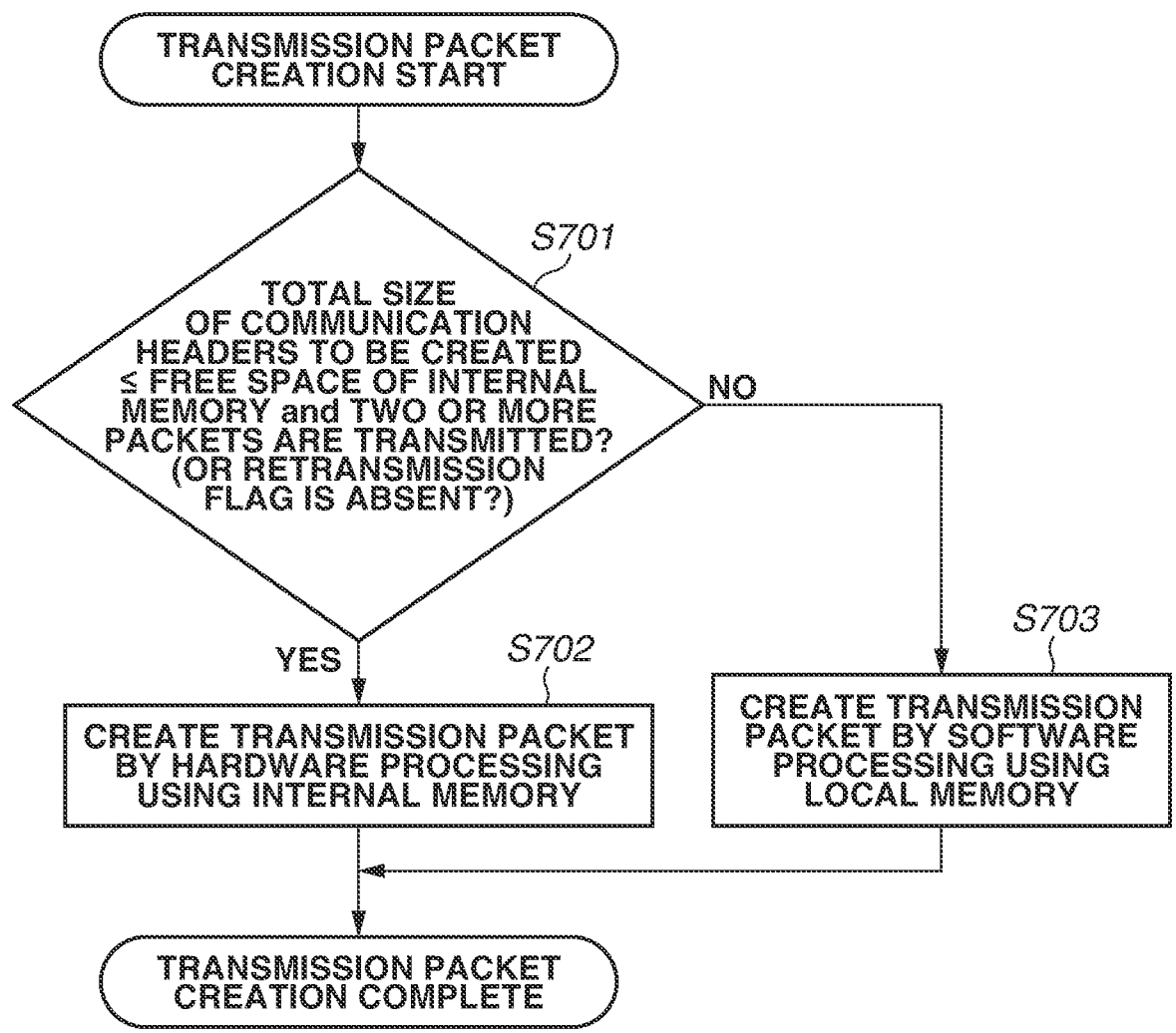
FIG. 7 is a flowchart illustrating a procedure for switching transmission packet creation units according to one or more aspects of the present disclosure.

FIG. 7 is a flowchart illustrating a procedure for the communication apparatus 100B according to the third exemplary embodiment to switch the transmission packet creation units.

In step S701, in the case of creating transmission packets, the TCP/IP control unit 204 of the communication apparatus 100B uses the packet type determination unit 211 to determine the type of each transmission packet, in addition to the condition of step S301. Specifically, the packet type determination unit 211 confirms (determines) the number of transmission packets and a retransmission flag, in addition to the condition of step S301. If the condition of step S301 is satisfied and the number of transmission packets is two or more (YES in step S701), the processing proceeds to step S702. If the condition of step S301 is satisfied and the retransmission flag cannot be confirmed (YES in step S701), the processing proceeds to step S702. If the transmission packets include no retransmission packet (or if the transmission packets are not retransmission packets), the retransmission flag cannot be confirmed.

On the other hand, if the condition of step S301 is satisfied but the number of transmission packets is one (NO in step S701), the processing proceeds to step S703. Even when the condition of step S301 is satisfied, if the retransmission flag is present (or if the retransmission packet is included) (NO in step S701), the processing proceeds to step S703.

The case where the processing proceeds to step S703 from step S701 corresponds to, for example, a case where the number of transmission packets is one even when the header data size is equal to or less than the free space of the internal memory 113.

Since the template header 115 is created by software processing, if the number of transmission packets is one, the load of the transmission packet creation processing can be reduced when the second packet creation unit 206 creates the communication headers 118 in the local memory 107. In other words, if the number of transmission packets is one, the load of the transmission packet creation processing can be reduced when the second packet creation unit 206 creates the communication headers 118 in the local memory 107, as compared with the case where the first packet creation unit 205 creates the communication headers 118 in the internal memory 113.

Further, when the transmission packets include retransmission packets, there is a need to create the template header 115 for the retransmission packet. Therefore, when the second packet creation unit 206 creates the communication headers 118 in the local memory 107, the load of the transmission packet creation processing can be reduced. In other words, also in this case, the load of the transmission packet creation processing can be reduced when the second packet creation unit 206 creates the communication headers 118 in the local memory 107, as compared with the case where the first packet creation unit 205 creates the communication headers 118 in the internal memory 113.

Step S702 is similar to step S302. Step S703 is similar to step S303.

Advantageous Effects of Third Exemplary Embodiment

In the case of collectively creating a plurality of transmission packets, the communication apparatus 100B according to the present exemplary embodiment selectively uses the first packet creation unit 205 and the second packet creation unit 206 based on the total size of communication headers to be created and the type (the number of transmission packets, and a retransmission flag) of each transmission packet. Consequently, the efficiency of the transmission packet creation processing can be improved and a deterioration in communication performance can be suppressed or prevented as compared with the first exemplary embodiment. In other words, the efficiency of the transmission packet creation processing can be improved and a deterioration in communication performance can be suppressed or prevented as compared with the case where the first packet creation unit 205 creates transmission packets (the processing proceeds from step S301 to step S302) every time when the internal memory 113 can be used.

MODIFIED EXAMPLE

In step S701, in the case where the condition of S301 is satisfied, as long as the retransmission flag is absent, the determination result of step S701 indicates YES even if the number of transmission packets is not two or more. In step S701, in the case where the condition of step S301 is satisfied, as long as the retransmission flag is absent, the determination result of step S701 indicates YES even if the number of transmission packets is two or more. The processing in step S701 according to the present exemplary embodiment is not limited to such processing. For example, the determination result of step S701 may indicate YES when the condition of step S301 is satisfied as well as only when the number of transmission packets is two or more and the retransmission flag is absent. In the third exemplary embodiment, one or more conditions are added to the determination condition of step S301, and which one of the first packet creation unit 205 and the second packet creation unit 206 is to be used is determined (selected) based on the determination result. Making a determination using the additional condition(s) in step S701 enables a further improvement in the efficiency of the transmission packet creation processing.

In step S701, the determination may be made based on the protocol type.

Next, a communication apparatus 100C according to a fourth exemplary embodiment of the present disclosure will be described with reference to FIGS. 1, 2, and 8. In the following description, components, controls and processing similar to those of the first exemplary embodiment are denoted by the same reference numerals, and descriptions thereof will be omitted.

In the first exemplary embodiment, the first packet creation unit 205 and the second packet creation unit 206 are selectively used based on whether the total size of communication headers to be created is equal to or less than the size of the free space 119 of the internal memory 113. The present disclosure is not limited to this exemplary embodiment. For example, the first packet creation unit 205 and the second packet creation unit 206 may be selectively used based on whether the free space 119 of the internal memory 113 is equal to or more than the header size per packet. The communication apparatus 100C that performs such processing will be described below as the fourth exemplary embodiment.

(Configuration of Apparatus)

A module configuration of the communication apparatus 100C according to the fourth exemplary embodiment is similar to that of the first exemplary embodiment (FIG. 1). A software configuration of the communication apparatus 100C according to the fourth exemplary embodiment is a configuration in which a transmission data size determination unit is added to the software configuration (first exemplary embodiment) illustrated in FIG. 2. It can also be said that this software configuration is a configuration in which the packet type determination unit 211 in the software configuration (third exemplary embodiment) illustrated in FIG. 6 is replaced by the transmission data size determination unit.

The transmission data size determination unit compares the free space 119 of the internal memory 113 with the header size per packet. Further, the transmission data size determination unit determines a size of data to be extracted from the application buffer based on the pieces of communication header information of packets received from another communication apparatus, the free space of a memory, or the like. The transmission data size determination unit is used by the TCP/IP control unit 204.

(Packet Transmission Selectively Using Packet Creation Units)

Figure 8:
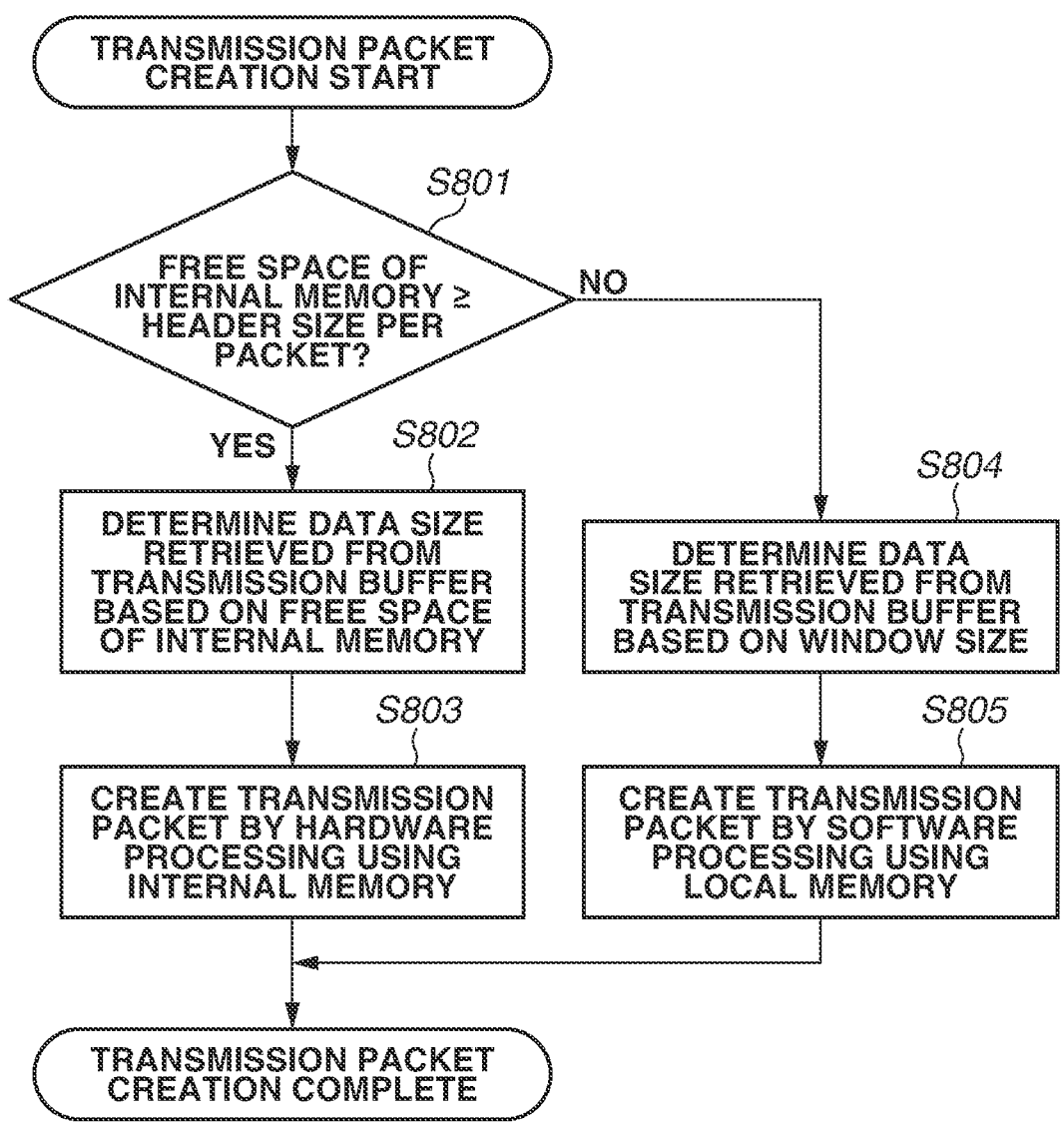
FIG. 8 is a flowchart illustrating a procedure for switching transmission packet creation units according to one or more aspects of the present disclosure.

FIG. 8 is a flowchart illustrating a procedure for the communication apparatus 100C according to the fourth exemplary embodiment to switch the transmission packet creation units.

In step S801, in the case of creating transmission packets, the TCP/IP control unit 204 of the communication apparatus 100C uses the transmission data size determination unit to compare the free space 119 of the internal memory 113 with the header size per packet. Specifically, the TCP/IP control unit 204 determines whether the free space 119 of the internal memory 113 is equal to or more than the header size per packet. If the free space 119 of the internal memory 113 is equal to or more than the header size per packet (YES in step S801), the processing proceeds to step S802. If the free space 119 of the internal memory 113 is less than the header size per packet (NO in step S801), the processing proceeds to step S804. In the flowchart of FIG. 8, the header size per packet is used as the size to be compared with the free space 119 of the internal memory 113, but instead the total of header sizes of a plurality of packets may be used.

If the determination result of step S801 indicates YES, the TCP/IP control unit 204 determines that the internal memory 113 can be used. In the first exemplary embodiment, it is determined that the internal memory 113 can be used when the free space 119 of the internal memory 113 is equal to or more than the total size of communication headers. However, in the present exemplary embodiment, it is determined that the internal memory 113 can be used when the free space 119 is equal to or more than the header size per packet. If the determination result of step S801 indicates NO, the TCP/IP control unit 204 determines that the internal memory 113 cannot be used.

In step S802, the TCP/IP control unit 204 calculates the number of headers that can be stored in the free space 119 of the internal memory 113 so that the first packet creation unit 205 creates transmission packets using the internal memory 113. To calculate the number of headers, the TCP/IP control unit 204 uses the transmission data size determination unit. Further, the TCP/IP control unit 204 causes the transmission data size determination unit to determine a size of data to be extracted from a transmission buffer based on the size of data that can be transmitted by a number of packets corresponding to the number of headers. Specifically, in step S802, the transmission data size determination unit determines a size of data to be extracted from the transmission buffer based on the free space 119 of the internal memory 113.

Although the processing in step S803 is similar to that in step S302, the first packet creation unit 205 creates transmission packets based on the data size determined in step S802. In other words, the number of transmission packets to be created is determined by the data size determined in step S802.

In a case where the processing proceeds to step S804 from step S801, the TCP/IP control unit 204 has determined that the internal memory 113 cannot be used, and thus the second packet creation unit 206 creates transmission packets. In step S804, the TCP/IP control unit 204 determines a size of data to be extracted from the transmission buffer based on the pieces of communication header information about packets received from another communication apparatus so that the second packet creation unit 206 creates transmission packets. The communication header information about a packet received from another communication apparatus includes, for example, a window size. To determine a size of data to be extracted from the transmission buffer, the TCP/IP control unit 204 uses the transmission data size determination unit.

Although the processing in step S805 is similar to that in step S303, the second packet creation unit 206 creates transmission packets based on the data size determined in step S804. In other words, the number of transmission packets to be created is determined by the data size determined in step S804.

Fourth Exemplary Embodiment

To collectively create a plurality of transmission packets, the communication apparatus 1000 first determines whether the free space 119 of the internal memory 113 is equal to or more than the header size per packet (S801). If the free space 119 of the internal memory 113 is equal to or more than the header size per packet, the communication apparatus 1000 determines that the internal memory 113 can be used, and thus the first packet creation unit 205 creates transmission packets. Further, the communication apparatus 1000 determines a size of data to be extracted from the transmission buffer based on the free space 119 of the internal memory 113, and then creates transmission packets. In the present exemplary embodiment, such processing enables the first packet creation unit 205 to create transmission packets until the internal memory 113 is used up, which leads to an improvement in communication performance.

Also in the present exemplary embodiment, if the free space 119 of the internal memory 113 is insufficient (NO in step S801), the second packet creation unit 206 is used to create transmission packets, without using the first packet creation unit 205 (without waiting for release of the internal memory 113) (steps S804 and S805). Consequently, it is possible to prevent the processing of the first packet creation unit 205 from being unexecuted due to waiting for release of the internal memory 113 and also prevent a deterioration in the communication performance of the communication apparatus 100C.

Next, a communication apparatus 100D according to a fifth exemplary embodiment of the present disclosure will be described with reference to FIGS. 1, 2, and 9. In the following description, components, controls and processing similar to those of the first exemplary embodiment are denoted by the same reference numerals, and descriptions thereof will be omitted.

In the first exemplary embodiment, if the total size of communication headers to be created is larger than the size of the free space 119 of the internal memory 113, the second packet creation unit 206 is constantly used (the processing proceeds from step S301 to step S303). The present disclosure is not limited to this exemplary embodiment. For example, if the total size of communication headers to be created is larger than the size of the free space 119 of the internal memory 113, it is determined whether the free space of the local memory 107 satisfies a predetermined condition. If the free space of the local memory 107 satisfies the predetermined condition, the second packet creation unit 206 is used. If the free space of the local memory 107 does not satisfy the predetermined condition, there is no need to use the second packet creation unit 206. The communication apparatus 100D that performs such processing will be described below as the fifth exemplary embodiment.

In the fifth exemplary embodiment, if the free space of the local memory 107 does not satisfy the predetermined condition, the communication apparatus 100D confirms whether there is another available memory, and if there is another available memory, the communication apparatus 100D uses the memory to create transmission packets. If there is no other available memory, the communication apparatus 100D waits for release of the internal memory 113 or the local memory 107, and the first packet creation unit 205 or the second packet creation unit 206 is used to create transmission packets.

(Configuration of Apparatus)

A module configuration example of the communication apparatus 100D according to the fifth exemplary embodiment is similar to that of the first exemplary embodiment (FIG. 1). An example of a software configuration of the communication apparatus 100D according to the fifth exemplary embodiment is a configuration in which a second memory free space management unit is added to the software configuration (first exemplary embodiment) illustrated in FIG. 2. It can also be said that this software configuration is a configuration in which the packet type determination unit 211 in the software configuration (third exemplary embodiment) illustrated in FIG. 6 is replaced by the second memory free space management unit.

The second memory free space management unit manages the free space of the local memory 107. The second memory free space management unit is used by the TCP/IP control unit 204.

(Packet Transmission Selectively Using Packet Creation Units)

FIG. 9 is a flowchart illustrating a procedure for the communication apparatus 100D according to the present exemplary embodiment to switch the transmission packet creation units.

The processing in step S901 is similar to that in step S301. The processing in step S902 is similar to that in step S302. If the determination result of step S901 indicates NO, the processing proceeds to step S903.

In step S903, to create transmission packets, the TCP/IP control unit 204 of the communication apparatus 100D uses the second memory free space management unit and compares the free space of the local memory 107 with the header size per packet. Specifically, the TCP/IP control unit 204 determines whether the free space of the local memory 107 is equal to or more than the header size per packet. If the free space of the local memory 107 is equal to or more than the header size per packet (YES in step S903), the processing proceeds to step S904. If the free space of the local memory 107 is less than the header size per packet (NO in step S903), the processing proceeds to step S905. The case where the processing proceeds to step S905 from step S901 via step S903 corresponds to a case where the internal memory 113 and the local memory 107 do not have a sufficient free space. In this case, the TCP/IP control unit 204 determines that the internal memory 113 and the local memory 107 cannot be used to create transmission packets. Step S904 is similar to step S303.

In step S905, the TCP/IP control unit 204 determines whether a memory (referred to as "another memory" in FIG. 9) that can be used to create transmission packets is present except the internal memory 113 and the local memory 107. If another memory that can be used to create transmission packets is present (YES in step S905), the processing proceeds to step S906. If another memory that can be used to create transmission packets is not present (NO in step S905), the processing proceeds to step S907.

In step S906, the TCP/IP control unit 204 uses another memory other than the internal memory 113 and the local memory 107, and creates transmission packets by software processing. The transmission packet creation unit used in this case may be the second packet creation unit 206 using another memory instead of the local memory 107, or may be another unit.

In step S907, the TCP/IP control unit 204 waits for release of the internal memory 113 or the local memory 107 through the first memory free space management unit 207 and the second memory free space management unit. When the internal memory 113 is released, the TCP/IP control unit 204 causes the first packet creation unit 205 to create transmission packets. When the local memory 107 is released, the TCP/IP control unit 204 causes the second packet creation unit 206 to create transmission packets.

Advantageous Effects of Fifth Exemplary Embodiment

The communication apparatus 100D according to the fifth exemplary embodiment has advantageous effects similar to those of the first exemplary embodiment. Specifically, in the case of collectively creating a plurality of transmission packets, if the free space 119 of the internal memory 113 is insufficient (NO in step S901), the first packet creation unit 205 is not used (i.e., release of the internal memory 113 is not awaited). If the local memory 107 has a sufficient free space (YES in step S903), the second packet creation unit 206 is used to create transmission packets (step S904). Consequently, it is possible to prevent the processing of the first packet creation unit 205 from being unexecuted due to waiting for release of the internal memory 113 and also prevent a deterioration in the communication performance of the communication apparatus 100D.

In the case of collectively creating a plurality of transmission packets, if the internal memory 113 and the local memory 107 do not have a sufficient free space, the communication apparatus 100D confirms (determines) whether another available memory is present. If another available memory is present, the memory is used to create transmission packets. If there is no other available memory, the communication apparatus 100D waits for release of the internal memory 113 or the local memory 107. This processing prevents a deterioration in communication performance even when both the internal memory 113 and the local memory 107 have no sufficient free space.

MODIFIED EXAMPLE

In the flowchart illustrated in FIG. 9, the processing proceeds to step S906 or S907 after the determination of step S905. However, in a case where it has been already confirmed that another memory is present and the determination result of step S903 indicates NO, the processing may proceed to step S906 without passing through step S905.

In step S903, the header size per packet is compared with the free space of the local memory 107, but instead the header size of a predetermined number of (a plurality of) packets may be compared with the free space of the local memory 107.

Other Exemplary Embodiments

The communication apparatuses 100 to 100D are described in the above exemplary embodiments. However, the present disclosure can also be embodied (implemented) in other modes. For example, the present disclosure can also be implemented in such a manner that a program (computer program) for implementing one or more functions according to the exemplary embodiments described above is supplied to a system or apparatus via a network or recording medium (storage medium), and one or more processors in a computer of the system or apparatus load and execute the program. In this case, the program (program code) read from the recording medium implements the functions according to the exemplary embodiments. Further, the recording medium recording the program can constitute the present disclosure.

While the functions according to the exemplary embodiments can be implemented by executing the program loaded into the computer, the functions according to the exemplary embodiments described above may also be implemented by processing in which an operating system (OS) running on the computer performs a part or the whole of the actual processing based on an instruction from the program.

The communication apparatuses 100 to 100D may also include an operation unit and a display unit. For example, the operation unit receives an operation or input from a user. The operation unit includes, for example, a keyboard and a touch panel. The display unit has a function for outputting at least one of a visual display and audio. The display unit includes, for example, a liquid crystal panel, a light-emitting diode (LED), and a speaker, and performs various displays and audio output under control of the main CPU 101.

Figure 4:
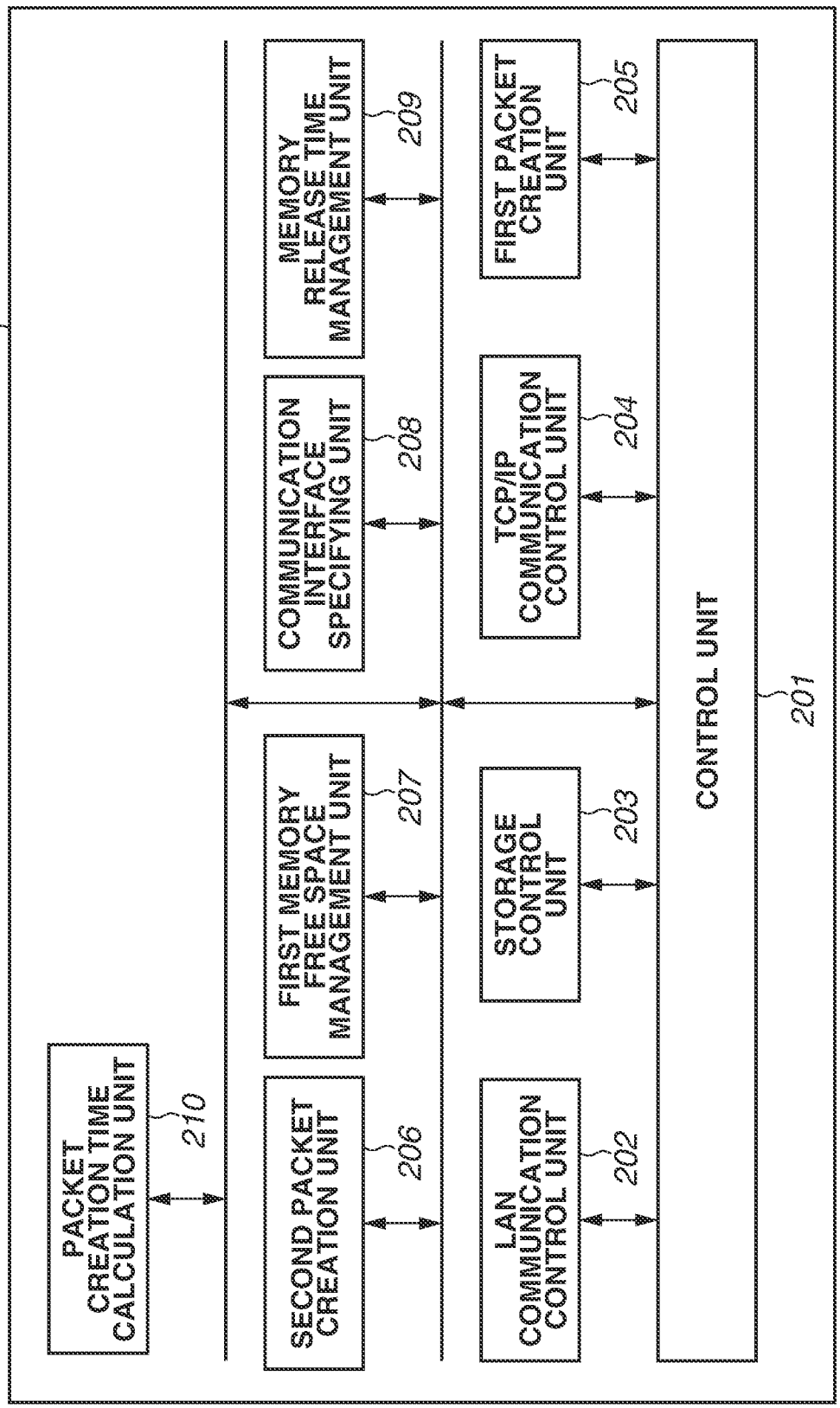
FIG. 4 is a block diagram illustrating an example of a configuration of a communication apparatus according to one or more aspects of the present disclosure.
Figure 6:
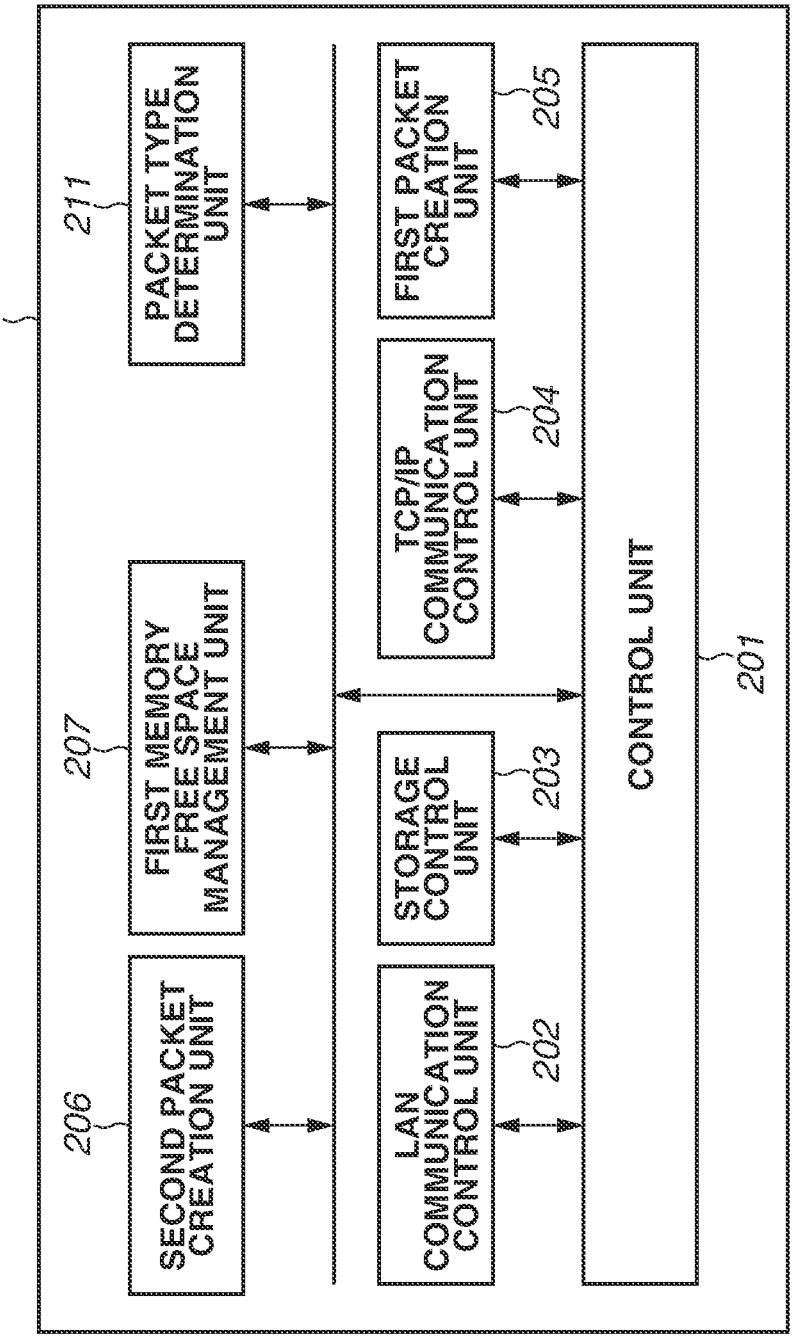
FIG. 6 is a block diagram illustrating an example of a configuration of a communication apparatus according to one or more aspects of the present disclosure.

In the exemplary embodiments described above, the wireless communication with another communication apparatus is controlled by the LAN communication control unit 202 illustrated in FIGS. 2, 4, and 6. However, if communication with another communication apparatus is performed using a communication method other than the wireless LAN, a communication control unit that replaces the LAN communication control unit 202 is used. The communication with another communication apparatus may be wireless communication or wired communication.

Any apparatus can be used as each of the communication apparatuses 100 to 100D, as long as the apparatus includes a communication function and a function for creating communication headers by hardware or software. Examples of the apparatus includes a personal computer, a tablet computer, a smartphone, a camera, and a projector. The header processing unit 110 may be configured as a processor.

The software configurations illustrated in FIGS. 2, 4, and 6 are merely examples. The plurality of blocks may constitute one block, or some of the blocks may be divided into blocks for performing a plurality of functions.

At least some of the blocks illustrated in FIGS. 2, 4, and 6 may be implemented by hardware. In the case where some blocks are implemented by hardware, for example, a dedicated circuit may be automatically created on a Field-Programmable Gate Array (FPGA) from a program for implementing each step, using a predetermined compiler. Further, similar to the FPGA, a gate array circuit may be formed to implement the blocks by hardware. Furthermore, the blocks may be implemented by an Application Specific Integrated Circuit (ASIC).

According to the present disclosure, it is possible to efficiently create transmission packets even when the free space of a storage unit for storing headers of transmission packets is insufficient.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-180037, filed Sep. 20, 2017, which is hereby incorporated by reference herein in its entirety.

What is claimed is:

1. A communication apparatus comprising:
   one or more generators configured to, by using a first memory that stores header information of one or more transmission packets, generate one or more TCP (Transmission Control Protocol)/IP (Internet Protocol) transmission packets by a first processing procedure;
   one or more processors;
   memories including at least the first memory and a second memory that stores header information of one or more transmission packets, the memories including instructions that, when executed by the processor(s), cause communication the apparatus to:
   determine size of the header information and a free space of the first memory;
   cause the one or more generators to generate the one or more TCP/IP transmission packets in a case where it is determined that the free space of the first memory is more than the size of the header information; and
   generate, by using the second memory, the one or more TCP/IP transmission packet by a second processing procedure different from the first processing procedure in a case where it is determined that the free space of the first memory is less than the size of the header information.

2. The communication apparatus according to claim 1, wherein the second memory is an internal memory of the processor(s).

3. The communication apparatus according to claim 1, wherein in a case where the free space of the first memory is less than the size of the header information and a release waiting time of the first memory is less than a packet creation time of the processor(s), the communication apparatus waits for release of the first memory and causes the one or more generators to generate the one or more transmission packets.

4. The communication apparatus according to claim 3, wherein the processor(s) specify a communication interface through which the one or more transmission packets are transmitted to another communication apparatus,
   wherein the release waiting time of the first memory is a time determined based on the specified communication interface.

5. The communication apparatus according to claim 3, wherein in a case where the free space of the first memory is less than the data size of the header information and a release waiting time of the first memory is more than a packet creation time of the processor(s), the processor(s) generate the one or more transmission packets.

6. The communication apparatus according to claim 1, wherein even when the size of the header information is less than the free space of the first memory, the processor(s) generate one transmission packet in a case where a number of the transmission packets is 1.

7. The communication apparatus according to claim 1, wherein even when the size of the header information is less than the free space of the first memory, the processor(s) generate the one or more transmission packets in a case where the one or more transmission packets are a retransmission packet(s).

8. The communication apparatus according to claim 1, wherein in a case where the free space of the first memory is less than the size of the header information and the free space of the second memory is less than a header size of a predetermined number of packets, the processor(s) use a third memory to generate the one or more TCP headers and the one or more IP headers by software processing, without using the second memory.

9. The communication apparatus according to claim 8,
wherein in a case where the third memory is not available, the processor(s) wait for release of one of the first memory and the second memory, and
wherein the processor(s) cause the one or more generators to generate the one or more transmission packets in a case where the first memory is released, and generate the one or more transmission packets in a case where the second memory is released.

10. A control method for a communication apparatus, the method comprising:
generating, by one or more generators, by using a first memory that stores header information of one or more transmission packets, one or more TCP (Transmission Control Protocol)/IP (Internet Protocol) transmission packets by a first processing procedure;
determining size of the header information and a free space of the first memory;
generating the one or more TCP headers and the one or more TCP/IP transmission packets in a case where it is determined that the free space of the first memory is more than the size of the header information; and
generating, by using a second memory, the one or more TCP/IP transmission packets by a second processing procedure different from the first processing procedure in a case where it is determined that the free space of the first memory is less than the size of the header information.

11. A non-transitory computer-readable storage medium storing a computer program for causing a computer to execute a control method for a communication apparatus, the method comprising:
generating, by one or more generators, by using a first memory that stores header information of one or more transmission packets, one or more TCP (Transmission Control Protocol)/IP (Internet Protocol) transmission packets by a first processing procedure;
determining size of the header information and a free space of the first memory;
generating the one or more TCP headers and the one or more TCP/IP transmission packets in a case where it is determined that the free space of the first memory is more than the size of the header information; and
generating, by using a second memory, the one or more TCP/IP transmission packets by a second processing procedure different from the first processing procedure in a case where it is determined that the free space of the first memory is less than the size of the header information.

* * * * *